United States Patent
Ho et al.

(10) Patent No.: US 9,655,215 B1
(45) Date of Patent: May 16, 2017

(54) SYSTEM AND METHOD FOR ENSURING MINIMAL CONTROL DELAY TO GROUPED ILLUMINATION DEVICES CONFIGURED WITHIN A WIRELESS NETWORK

(71) Applicant: Ketra, Inc., Austin, TX (US)

(72) Inventors: Horace C. Ho, Austin, TX (US);
Rebecca Frank, Austin, TX (US);
Mark Quilling, Austin, TX (US);
Rebecca M. Ho, Austin, TX (US); Nav Sooch, Austin, TX (US)

(73) Assignee: Ketra, Inc., Austin, TX (US)

( * ) Notice: Subject to any disclaimer, the term of this patent is extended or adjusted under 35 U.S.C. 154(b) by 0 days.

(21) Appl. No.: 15/041,300

(22) Filed: Feb. 11, 2016

(51) Int. Cl.
H05B 37/00 (2006.01)
H05B 37/02 (2006.01)
H05B 33/08 (2006.01)

(52) U.S. Cl.
CPC ....... *H05B 37/0272* (2013.01); *H05B 33/086* (2013.01); *H05B 33/0845* (2013.01)

(58) Field of Classification Search
CPC ............ H05B 37/0272; H05B 33/0845; H05B 39/088
USPC ................. 315/291, 294, 297, 307, 318–319
See application file for complete search history.

(56) References Cited

U.S. PATENT DOCUMENTS

| 7,889,051 B1 * | 2/2011 | Billig | H04L 12/2818 340/286.01 |
| 9,215,779 B2 | 12/2015 | Restrepo et al. | |
| 2006/0250980 A1 * | 11/2006 | Pereira | H04L 12/2803 370/254 |
| 2009/0026966 A1 * | 1/2009 | Budde | H05B 37/02 315/152 |
| 2011/0234366 A1 * | 9/2011 | Feng | G08C 17/02 340/3.1 |
| 2012/0139417 A1 | 6/2012 | Mironichev et al. | |
| 2013/0063042 A1 | 3/2013 | Bora et al. | |
| 2013/0285574 A1 * | 10/2013 | Garcia Morchon | H05B 37/0245 315/297 |
| 2014/0167623 A1 | 6/2014 | Chobot et al. | |
| 2014/0246991 A1 | 9/2014 | Kim | |
| 2015/0091473 A1 | 4/2015 | Clavenna, II et al. | |
| 2015/0198938 A1 | 7/2015 | Steele et al. | |

(Continued)

FOREIGN PATENT DOCUMENTS

WO WO 2014/138822 A1 9/2014

OTHER PUBLICATIONS

United States Patent and Trademark Office, Non-Final Office Action, U.S. Appl. No. 15/041,166, dated Dec. 21, 2016.

*Primary Examiner* — Jason M Crawford
(74) *Attorney, Agent, or Firm* — Kevin L. Daffer; Matheson Keys Daffer & Kordzik PLLC

(57) ABSTRACT

A lighting control system and method is disclosed for not only controlling visual content loaded within a group set of illumination devices configured within a wireless network, but also for ensuring minimal control delay to those grouped devices. The lighting control system can include a lighting controller device that controls a plurality of lamps within a mesh network, not only to group those lamps but also to assign content to lamps within that group. The combination of a guaranteed groupcast to each of the group of lamps and an acknowledge back from those lamps that is aggregated over a single path achieves the improved lighting control system disclosed herein.

8 Claims, 10 Drawing Sheets

(56) References Cited

U.S. PATENT DOCUMENTS

| | | |
|---|---|---|
| 2015/0282282 A1 | 10/2015 | Breuer et al. |
| 2015/0359061 A1 | 12/2015 | Adler |
| 2015/0373810 A1 | 12/2015 | Aliakseyeu et al. |
| 2016/0088708 A1* | 3/2016 | Anthony .............. H05B 37/029 315/294 |
| 2016/0120009 A1 | 4/2016 | Aliakseyeu et al. |

* cited by examiner

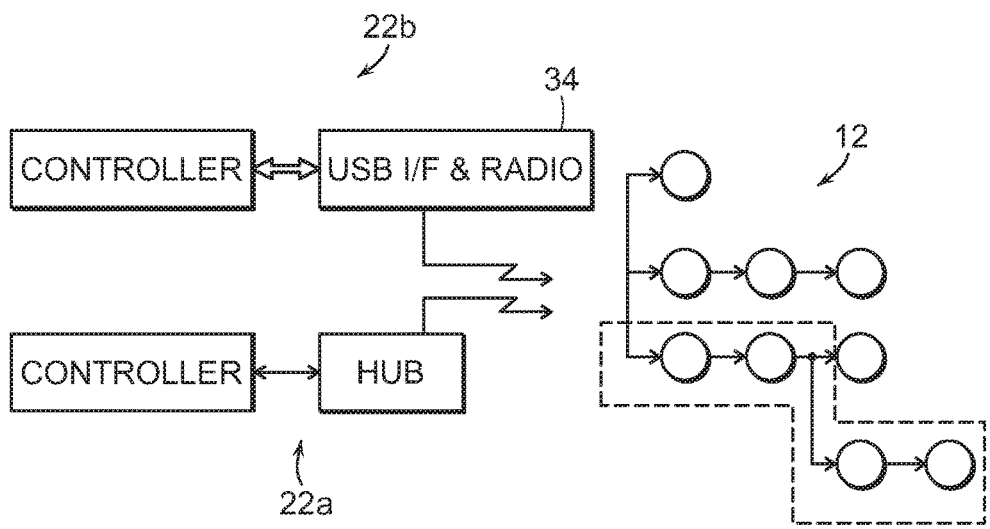
FIG. 5
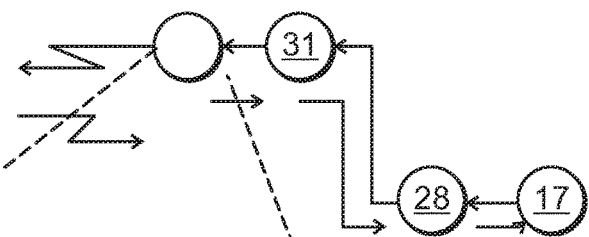
FIG. 6
| GROUP | CONTENT | DEST ADDR | NEXT HOP |
|---|---|---|---|
| F | C | 31, 28, 17 | 31 |
GROUPCAST TABLE — ROUTING TABLE
FIG. 7

SYSTEM AND METHOD FOR ENSURING MINIMAL CONTROL DELAY TO GROUPED ILLUMINATION DEVICES CONFIGURED WITHIN A WIRELESS NETWORK

CROSS REFERENCE TO RELATED APPLICATION

This application is related to co-pending application filed concurrently herewith under Ser. No. 15/041,166, entitled "Device, System and Method for Controlling Visual Content Loaded Into A Grouped Set of Illumination Devices Configured Within A Wireless Network."

BACKGROUND OF THE INVENTION

1. Field of the Invention

This invention relates to illumination devices and, more particularly, to illumination devices interconnected by a network and controlled based on groupings of those devices and content stored therein.

2. Description of the Relevant Art

The following descriptions and examples are provided as background only and are intended to reveal information that is believed to be of possible relevance to the present invention. No admission is necessarily intended, nor should be construed, that any of the following information constitutes prior art impacting the patentable character of the subject matter claimed herein.

A certain type of illumination device, known as light emitting diodes (LEDs) for illumination are becoming increasing popular in many different markets. Accordingly, the use of the term illumination device hereinafter refers to a lamp that is based on the use of one or more LEDs. LEDs provide a number of advantages over traditional light sources, such as incandescent and fluorescent light bulbs, including low power consumption, long lifetime, no hazardous material, and additional specific advantages for different applications. Of particular importance is that for general illumination, LEDs provide the opportunity to adjust the color or the color temperature to produce different lighting effects. For example, effects such as tint, vibrancy and brightness can be adjusted through the use of lamps based on lamps having LEDs. The color, color temperature and lighting effects can also be modified as a function of time in accordance with what is known as the circadian rhythm, or can be modified to produce different lighting scenes or, as a function of time, lighting shows.

Another advantage of the use of LED lamps is that the lamps can be configured to communicate with one another wirelessly. The color, color temperature and lighting effects can be modified through use of a wireless network of lamps placed within a residence. As noted hereinafter, a residence is any structural dwelling that contains at least a portion of the network of lamps that are interconnected wirelessly and can be controlled by a user within that residence or coupled to the residence by, for example, the internet.

The various types of networks that interconnect devices in general are fairly well known and documented. However, it is not until recently, since the advent of LED-type lamps, that lamps can be more readily controlled through wireless personal area networks (WPANs). Due to the nature of the solid-state control mechanism of LEDs, command signals can be sent across the wireless network to adjust, for example, color, brightness or lighting effects. However, the primary purpose of such networked lighting control systems is to be able to group the commands based upon sensor readings taken at one or more of the networked lamps in order to make the adjustments specific to a group within the network. Such network lighting control systems recognize that it is unfeasible to assign scenes to a group of lamps interconnected through a network since it is burdensome for a user to do so and because there is an almost infinite number of possible lighting scenes. Thus, many of the network-based conventional lighting control system take readings of the surrounding environment (e.g., whether it is light or dark within the room) and adjust a specific group of the networked lamps accordingly based on the sensor readings, and not based on scenes that are assigned to the group. See, for example, U.S. Pub. Nos. 2013/0285574 and 2014/0167623.

It is therefore desirable to implement lamps having LEDs that are interconnected through a WPAN, and which can be controlled in any fashion to adjust brightness, color or any lighting effect, either static or as a function of time, without necessarily relying on the conventional mechanism of using the LEDs for sensing the surrounding environment and adjusting the network control accordingly. A need exists for using an improved broadcast mechanism to specific groups of lamps, hereinafter referred to as the improved groupcast messaging system with an aggregated acknowledgment along a single path, in what is known as the improved unicast acknowledged message system. A need also exists for assigning any visual content into a group set of lamps, such content and grouping is adaptable to anything the user desires and, if needed, scenes or content can be pre-defined within certain pre-assigned groups, so that when a group is selected, the content within the grouped lamps will produce the corresponding color, brightness or lighting effects desired. Sensing by one or more of the lamps is not needed in order to set the scenes, and thus the content within the lamps. A substantially limitless number of scenes can be chosen by a user or a select few can be pre-defined, thus avoiding the detriments of the conventional network lighting control systems.

SUMMARY OF THE INVENTION

The following description of various embodiments of a lamp illumination device interconnected through a wireless network to form a lighting control system and method hereof is not to be construed in any way as limiting the subject matter of the appended claims. Instead, the following description outlines various solutions to the problems described above, wherein such problems are in large part solved by an improved lighting control system of lamps wirelessly interconnected, and in communication with a lighting controller, such as a computer with a wireless interface and a graphical user interface (GUI).

According to one embodiment, a lighting control system is provided. The lighting control system includes a plurality of lamps coupled together over a network, such as a mesh network. The plurality of lamps are wirelessly coupled, and communicate with each other over a WPAN using, for example, a communication protocol such as IEEE 802.15.4, oftentimes referred to as ZigBee. The lighting control system, in addition to a plurality of lamps coupled to one another via a wireless network, also includes a controller. The controller can be an execution device, such as a computer that can execute upon software to generate a graphical user interface (GUI). The controller also has a wireless interface that wirelessly communicates with the plurality of lamps. The GUI allows user input to arrange icons representing the group of lamps, whereby each lamp is shown on the GUI as a "virtual lamp." Also shown on the GUI is a named group icon, or an icon that simply has a name associated with the location and function of lamp icons, or virtual lamps, to be placed therein. The named group icon can include, for example, a name such as bedroom downlight or bedroom night stand, or kitchen island, etc. A scene is associated with the named group icon so that whatever virtual lamps are placed in that named group icon, all physical lamps located in the residence and associated therewith will have stored content needed to reproduce the associated scene.

According to another embodiment, the named group icon need not be pre-named but can take on any name selected by user. Moreover, once the group icon is named, any of a substantially unlimited number of scenes can be associated with that named group icon. Therefore, a substantially unlimited variation of content can be downloaded to the physical lamps, as well as a seemingly endless variety of group names and addresses and specifically group addresses assigned to the physical lamps.

Accordingly, the group names can be pre-defined, as well as the scene associated with each pre-defined group name. Note that the scene is assigned to the group icon, whereas the scene exists as content when stored in the physical lamps. A bedroom night stand may be pre-defined on the GUI, as well as a pre-defined scene/show associated with that group name. Therefore, a user need only assign certain lamps to the pre-defined group name and scene/show and, once assigned, any actuation on the assigned-to button will cause a control message to be sent to the appropriate physical lamp within the residence to turn on that lamp as well as other lamps assigned to the group to activate those lamps with the same scene or show.

Alternatively, neither the group nor the scene/show need be pre-defined. Instead, when lamps are assigned to a group, the group can be given any name desired by the user. Also, instead of the group having a pre-defined scene, the named group on the GUI having a corresponding pre-defined scene, than the group that is named by the user when virtual lamps are applied to that grouped named group icon, any of a numerous variety of scenes (or content) can also be applied to that named group icon the scene, which is static and is activated when a button is actuated and remains until another button is actuated can take on a substantially unlimited variety of settings in color, brightness, or any other type of lighting effect. If a show is desired, then actuating the button may activate a show which is nothing more than a scene as a function of time to produce a desired circadian rhythm, or any other modifications to color, brightness or visual effect that changes with time, and until another button is actuated.

According to yet another embodiment, the lighting controller device that controls the plurality of lamps not only provides a GUI to select groups of physical lamps and assign those groups to specific scenes based on their function and location within a residence, but also during the procedure of grouping and assigning a scene on the GUI (or content to the physical lamps) a visual indicator on the lamp icon and the named group icon is designed to correspond with a visual indicator from the physical lamp and physical keypad control device. By visually indicating on the physical devices (physical lamps and keypads within the residence) and virtual devices (lamp icons and keypad icons) on the GUI, commissioning of lamps and keypads during a discovery procedure and thereafter during a grouping procedure can be visually confirmed by the user. By indicating both in the physical realm as well as the virtual realm, the user is assured that all of the physical devices have been discovered by the controller and, thereafter, grouped properly by the controller.

According to yet another embodiment, once all of the physical devices have been properly discovered and grouped, as well as grouped by scene or show, a novel groupcast control and acknowledge procedure can take place. In essence, the grouping procedure groups not only lamps, but also stored content associated with scenes and shows within the group of lamps and assigns that combination to a button. The button can be either the button on a physical keypad control device or a virtual keypad control device. As opposed to a physical keypad which is coupled within the residence to the AC mains and which wirelessly communicates with the lamps using, for example, ZigBee, a virtual keypad is what would appear on, for example, a mobile phone GUI. The virtual keypad would have buttons similar to those shown on a physical keypad, yet those buttons which appear on, for example, the mobile phone would perform the same function as buttons on a physical keypad, yet the communication must typically go through what is known as a bridge. A bridge is nothing more than a transceiver between two different wireless communication protocols, whereby a mobile device, such as a smartphone may communicate using a different protocol than, for example, ZigBee. A mobile device might communicate using the Ethernet, WiFi, or Bluetooth. The bridge is needed to bridge the different wireless communication protocols of, for example, the mobile phone to the lamps in order for the lamps to receive communication when a virtual button of a virtual keypad on the smartphone is actuated.

When, for example, a button is actuated, the button number as well as the keypad number can be sent as a control message to the network of lamps. Importantly, each of the lamps which are associated with a group of lamps has a group address as well as a unique address. The group address corresponds to a particular button depressed on a particular keypad. Thus, once the button of a keypad is depressed, the group addresses are accessed on only the physical lamps which have a unique address associated with a unique group address for that button keypad. By using group addressing when assigning group addresses to unique addresses that correspond to a particular button of a particular keypad, once a button of that keypad is actuated a broadcast signal need only be acknowledged by physical lamps having the corresponding unique group address. This form of broadcast is hereinafter referred to as a groupcast. The benefit of using a groupcast methodology rather than conventional unicast in a mesh lighting network is that the scene or show assigned to that button that was actuated will activate all of the physical lamps having the unique group address at substantially the same time. Typical network lighting control systems use what is known as unicast control, where the first of many lamps receives the control signal, and that control signal is forwarded to the child lamp through what is known as a hop. The procedure continues until all of the desired lamps within the group are activated. A significant problem with this type of unicast control is synchronization. Namely, all the lights change with certain delay from one light to the other causing what is often times referred to as the "popcorn effect." By utilizing unique groupcast addressing scheme along with scenes corresponding to buttons, once a button is actuated according to the present invention, a groupcast signal is sent to turn on or off, or change the scene or show, at substantially the same time since all of the group of physical lamps received the command message at the same time without having to go through the conventional unicast hop mechanism.

A further advantage of the present groupcast control mechanism is that a novel aggregated acknowledgement message mechanism is employed. For each of the group of physical lamps which receive the groupcast, those lamps must return an acknowledge. In a mesh network, such as the present network, the acknowledge, if used, is sent across different lamp-to-lamp paths back to the control device so that the control device knows that each of the group of lamps received the command message. Unfortunately, sending an acknowledge back on multiple, different paths can be time consumptive and can also add to the delay if, for example, one of the group of lamps does not turn on when instructed by the command message. Having to send back multiple paths of acknowledge, with one lamp not turning on, causes another message command to be sent by the control device to the lamp that did not acknowledge. The present acknowledgement mechanism avoids this problem by forming routing tables through use of previous acknowledged paths, and maintaining those routing tables to ensure that an acknowledge from each of the group of physical lamps is sent over the same path instructed by the previous routing table acknowledgements and if by chance one lamp, or a select few do not acknowledge over that single path, they would acknowledge on possibly no more than one or two different paths without requiring the control device to send another control message. The aggregated acknowledge mechanism over a single path is not only beneficial from a time delay perspective, but also can be dynamically altered through use of the pre-existing routing tables if a relatively few number of lamps do not acknowledge, which typically is the case in most settings since physical lamps generally stay put in the home. Thus, although the acknowledge message is unicast as a single message with aggregated unique addresses at the grouped subset of physical lamps that receive the groupcast control message, the aggregated unique addresses of the group addresses subset is assured of being sent primarily as a single message and not as multiple messages across multiple unicast path which would unduly hamper the bandwidth of the control and acknowledge back mechanism.

BRIEF DESCRIPTION OF THE DRAWINGS

Other objects and advantages of the invention will become apparent upon reading the following detailed description and upon reference to the accompanying drawings.

FIG. 5 is a block and plan diagram of controllers that control directly or indirectly information stored in each of the lamps within a network during a commissioning or discovery procedure, followed by a grouping and scene selection procedure;

FIG. 6 shows an example of content associated with a scene, as well as unique and group addresses stored in lamps during the discovery, grouping and scene selection procedures;

FIG. 7 shows an example of the data file of the information stored in the lamps during the discovery, grouping and scene selection procedures;

Figures 1, 2:
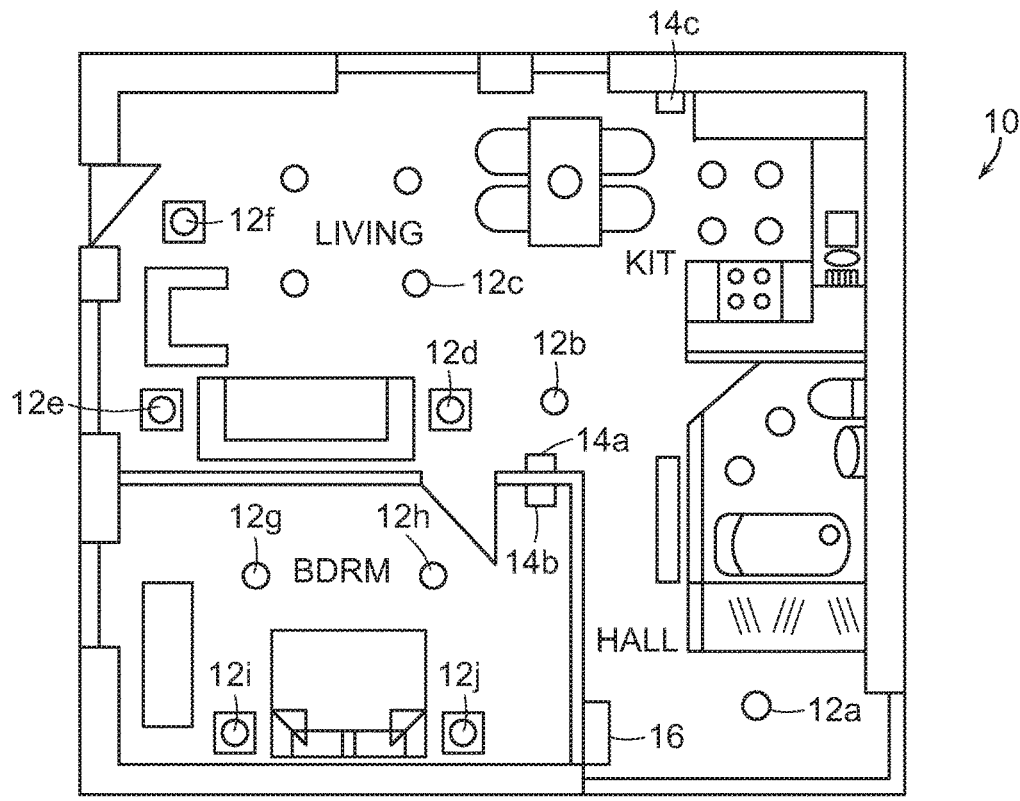
FIG. 1 is a plan diagram of a residence containing a plurality of lamps and control devices interconnected by a wireless network.
FIG. 2 shows an example of certain groupings of lamps based on location and function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 illustrates an example of a residence 10 containing a plurality of physical lamps 12a, 12b, 12c, etc. The physical lamps are sometimes interchangeably referred to as simply lamps. Not all lamps are labeled for sake of brevity in the drawings. A residence may have numerous bedrooms, living rooms, rooms in general, and a significant number of lamps 12 can be arranged throughout that residence more or less than those shown in FIG. 1. Preferably, each lamp comprises at least one LED and a communication interface for a first communication protocol, that communication protocol being a wireless communication protocol used by all of the lamps 12 within, for example, residence 10. A popular first communication protocol can be WPAN using IEEE 802.15.4 and/or any protocol based thereon, like ZigBee. The lamps are arranged in the various rooms, and have a specified function based mostly upon their location. For example, lamps in the ceiling can be PAR lamps, whereas lamps in night stands, or next to couches can be A20 lamps. There can also be lamps such as wall lamps, or any other type of configuration needed for a residence 10. For example, the living room can have four downlights, one of which is labeled 12c, with A38 lamps, for example. The living room may also have lamps mounted on stands next to a couch, or end table with A20 lights, for example, and labeled 12d, 12e and 12f. As an example to be used later, along with the living room, a bedroom can also have downlights, with two shown and labeled 12g and 12h. Next to the bed on night stands can be A20 lights, marked as lamps 12i and 12j.

In addition to lamps interconnected to a wireless network, control devices can also be interconnected. In the example shown in FIG. 1, physical keypads 14a, 14b and 14c are also placed within residence 10. As will be noted later, the physical keypads can be replaced by virtual keypads, and assigned to, for example, a mobile phone, and specifically the GUI shown on the mobile phone will appear identical the physical keypads with virtual buttons similar to the actual buttons on the physical keypads. The mobile phone can communicate using a different wireless communication protocol, for communicating over a second communication network. As opposed to the first communication protocol in which the physical lamps 12 and the physical keypads communicate, a second communication protocol is linked to the first communication protocol via a bridge 16 that can be placed in proximity to the residence and the residence 10 and can allow a second communication protocol such as Ethernet, WiFi, Bluetooth, etc. to communicate from, for example, a mobile phone to the lamps 12.

FIG. 2 illustrates an example in which lamps are grouped based on their location and function. The mechanism for providing the grouping as well as the function of the lamps will be disclosed later when describing the grouping mechanism as well as the scene/show assignment mechanism. However, as shown in FIG. 2, a location such as the bedroom can have two groups of lamps, a first group 18a associated with group A to provide a particular scene 1 or show 1 associated with the two downlights 12g and 12h shown in FIG. 1. Because the downlights might need to be controlled separate from the night stand lights, the downlights can be pre-assigned or assigned at any time by a user based on the desired function of those downlights. The two night stand lights can be placed in a different group and have a different scene or show assigned to them, as shown by numeral 18b. For example, the downlights in group A, 18a, can be made to have a brighter output in a different color than the two night stand lights, 18b. Since each of the physical lamps has one or more LEDs, the RGB of the plurality of LEDs can be tailored to any color, brightness or visual effect desired by the user.

In addition to the bedroom, the living room can also have its lamps assigned to groups, shown in labels 20a, 20b and 20c. The four downlights within the living room can be assigned to a group C with a unique scene and show labeled scene 3 and show 3, whereas the end table light can have a group D and assigned a different scene 4 or show 4. On either end of the couch are two couch table lights that are assigned to group E, and possibly to a scene 5 or show 5. By grouping the lamps and assigning lamps in those groups to different scenes or shows, virtually any type of lighting display can be achieved as desired by the user.

Figure 3:
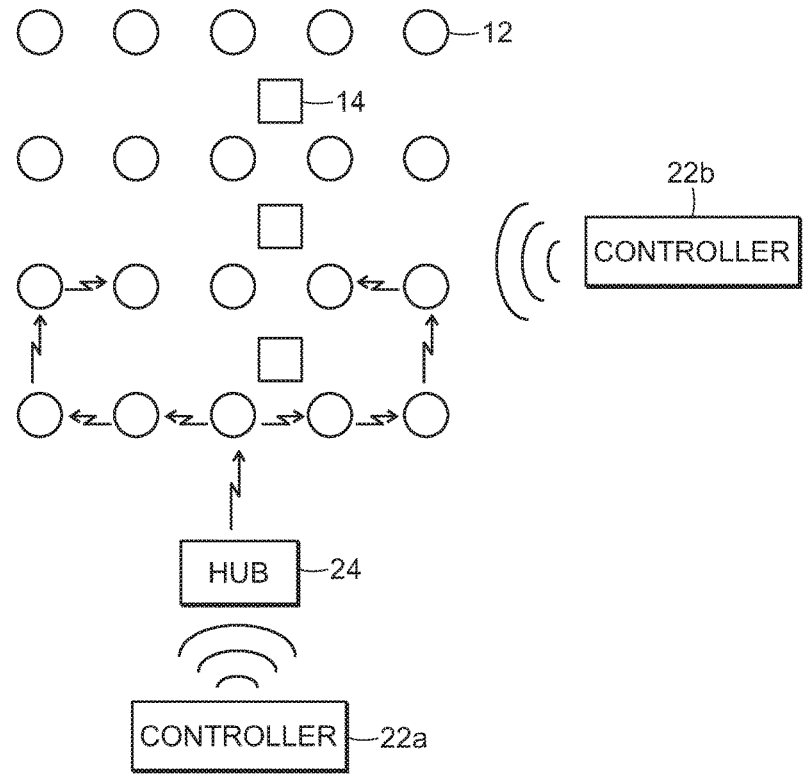
FIG. 3 is a plan diagram of the network of lamps and control devices wirelessly controlled directly by a controller such as laptop computer or indirectly by a controller such as a mobile phone.

FIG. 3 illustrates a plurality of lamps 12 interconnected by a wireless communication network. In addition to lamps 12 are physical keypads 14. The lamps can have any type of form factor including A20, PAR38, linear cove, wall washing lights, and track lights. The physical keypads can be mounted in a signal gang junction box and coupled to the AC mains. Moreover, virtual keypads can eliminate the physical keypads 14. The virtual keypads can exist on GUI applications on computers, and specifically mobile devices like a smartphone. The keypads, whether physical or virtual, are typically described as "control devices." In addition to the network of lamps 12 and physical keypads 14, a controller is used to control the communication to and from the network of lamps and keypads. Controller 22a, similar to controller 22b, is essentially an execution unit that executes on instructions and data to present a GUI the user can use to perform the grouping and scene/show assignments. Control instructions are sent through a communication interface from controller 22 to the network of lamps and keypads. The communication interface for controller 22b simply communicates correctly to the lamps and keypads using, for example, ZigBee communication protocol. Controller 22a, however, may communicate using a different protocol than ZigBee, and therefore communication may go through a bridge or hub 24 that bridges between ZigBee protocol and the protocol used by controller 22a. For example, a software application can operate on controller 22, possibly on either Apple or Android mobile devices to present the virtual keypad on controller 22. Hub, or bridge 24, bridges between WiFi and the wireless lamp network which can use ZigBee. If controller 22b is used, a dongle with a radio interface will allow the GUI of controller 22b to communicate directly with the network of lamps 12 and keypads 14.

A typical installation in a residence will have physical keypads and a variety of lamps in every room. In some cases, some rooms may have multiple keypads controlling the same lamps just like conventional two or three-way light switches. The physical keypads in each room then control the color, brightness, spectrum, or visual effects in general. The keypads can control such effects either statically, or as a function of time. A static control would simply be a user pushing a button on the physical keypad. The lamps and physical keypads in a residence can also be controlled by a computer running an application with a radio-based dongle plugged into a USB port, or can be controlled by a mobile device, such as a smartphone also running a software application. The dongle can communicate ZigBee messages directly, whereas the bridge, or hub 24 converts between WiFi and the ZigBee messages, for example.

After the physical lamps and physical keypads are installed in the residence 10, the lamps and keypads must be discovered before the grouping and scene building procedures. Thus, a first step when using, for example, a controller with a dongle is to discover all the lamps and keypads within range of that controller. The wireless network that the lamps 12 and keypads 14 use is preferably a mesh network, so lamps or keypads that are physically distant may still be in communication range of the controller through one or more hops. When a user instructs the controller to discover all devices, possibly through a command on the GUI of the controller, the dongle broadcasts a message instructing all devices that receive the message either directly or through any number of hops, to respond with their unique ID number, often times referred to as the MAC address. The unique MAC address of each of the lamps, as well as the keypads are sent back to the controller. The controller then displays on its GUI various icons on the GUI screen representing the physical lamps that have responded. The icons are sometimes referred to as the virtual lamps since a need exists to distinguish between the lamps that appear on the GUI as virtual lamps and lamps that exist in the residence, or physical lamps.

For example, in an installation with ten PAR lamps and five A20 lamps, and three physical keypads, fifteen virtual lamp icons with two different types of lamps will appear. The keypads will appear at a later step also as keypad icons. An indication that all of the lamps have been discovered occurs when an acknowledge message is sent back from each of the lamps to the controller, which causes each physical lamp to turn blue, each physical keypad to blink. Moreover, each of the discovered physical lamps and physical keypads will appear as icons on the GUI. If all of the physical lamps do not turn blue or the keypads blink upon user inspection by walking around the residence, not all acknowledge messages have been returned and thus the missing acknowledge message of the unique MAC lamp address would indicate a non-blue physical lamp has not been discovered. Remedial measures would then need to be taken, as described below. However, if all physical lamps turn blue on physical inspection, then the corresponding icons will appear and all of the physical lamps within the residence will appear as icons on the controller GUI.

Figure 4:
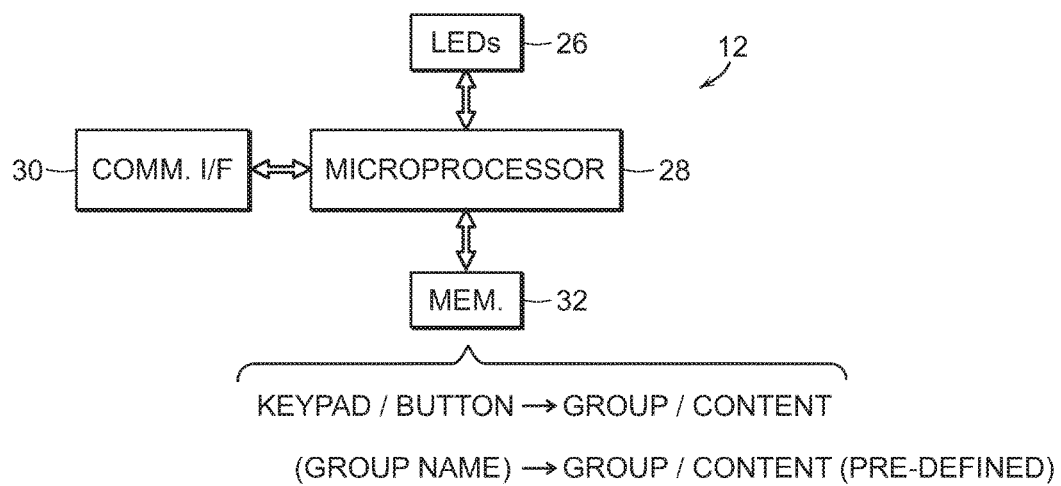
FIG. 4 is a block diagram of a lamp, with a unique address for each lamp, group addresses corresponding to a unique group of lamps and content stored in a memory of the lamp.

After all of the physical lamps and physical keypads have been discovered, the next step is grouping. In the grouping procedure or mechanism, physical lamps that need to be controlled together are assigned a specific group address. As shown in FIG. 4, the various components of a lamp 12 are shown, including LEDs 26, processor 28, communication interface 30 and memory 32. During the grouping mechanism a group address, as well as pre-defined or non pre-defined content associated with that group are downloaded into memory 32 of each lamp 12 thereafter, during a control mechanism, a single button actuation of a physical keypad, or actuation of a group name assigned to a virtual button of a virtual keypad will cause a control message to be sent from the controller to address via a single groupcast message all of the unique MAC addresses associated with that unique group address to launch the content associated with that group of physical LEDs via microprocessor 28 fetch mechanism to LEDs 26. Further descriptions of the group addressing, and storage of content within lamps 12 occur during the grouping mechanism, as well as the scene builder or show builder mechanism.

FIG. 5 illustrates in more detail the different types of controllers, in particularly the communication protocols applied to the plurality of lamps 12. A controller 22b can simply include a dongle with a USB interface and radio, the dongle is shown by reference numeral 34 plugged into the USB port of a computer, and the combination of both forms controller 22b. If controller 22a is to communicate through a hub, then controller 22a communicates using a different protocol then the protocol at which the various lamps 12 communicate with each other, as well as the physical keypad, if a virtual keypad is not used to replace the physical keypad.

During the discovery phase, for example, the broadcast discovery signal is sent front the controller through the mesh network from hop-to-hop, as shown by FIG. 6, with an acknowledge back from, for example, unique address 17 to unique address 28 to unique address of 31, illustrated for example in hexadecimal. The broadcast discovery and acknowledge back forms a routing table with a destination address and next hop address shown in FIG. 7 for a particular lamp. The routing table is stored in the memory of lamp 12, along with what we will describe later as the group address, as well as the content associated with that group address. The group address and content can have a group address of, for example F and C, respectfully, forming the groupcast table shown in FIG. 7.

Figure 8:
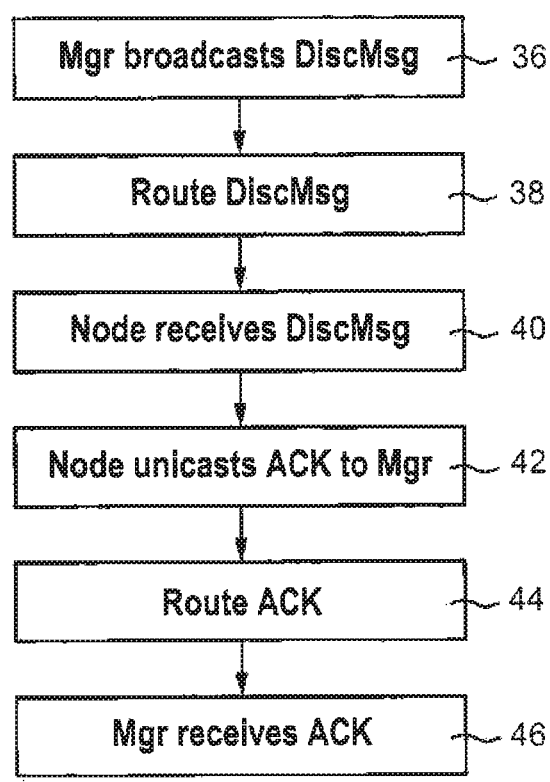
FIG. 8 is a flow diagram of the discovery procedure.

FIG. 8 is a flow diagram that illustrates the discovery procedure where a lamp and device control manager, controller broadcast, for example, a discovery message used to initialize the wireless network. At least once, after the lamps have been installed, a network configuration may be necessary. Such a network configuration may be repeated multiple times, for example, every day, every week, every month, or at random times, or when powering on the lighting system or parts thereof. The discovery process can also be done if the network is reconfigured, if lamps are added or removed, or a modification of lighting scenes has been made. When configuring the network during the discovery phase, controller at first has no knowledge about the available lamps. The structure of the network is not predetermined by installation like the cabling structure of a wired network. Instead, it may be determined by the plurality of physical conditions, like the distance or shielding materials between neighbored lamps, walls, or other devices between the lamps, or even by electromagnetic interference by electric appliances or other devices within the residence 10.

To compute the network configuration, preferably a broadcast is triggered by the controller 22. The broadcast message is transmitted by addressing the messages to a pre-defined broadcast address, to which all physical devices (lamps and keypads) are listening. For example, the broadcast signal will be received first by those devices that are in close proximity to the controller. Those lamps can then forward the broadcast message to other lamps, which further forwards the message to even further distal lamps via one or more hops. To complete the network configuration, it is necessary that the controller receives an acknowledge signal from each lamp, by which the lamp acknowledges that it has received a broadcast message. The acknowledge signal is preferably transmitted as a unicast or directed message back to the controller that sent the broadcast. FIG. 6 illustrates the return acknowledge message in the example of four lamps. Each lamp that sends such a unicast message must receive an acknowledge to prevent such lamps from resending the same message. Thus, as shown in FIG. 6, the return acknowledge is sent by controller back through the mesh network, also as a unicast message.

During the discovery phase, or discovery process, it is fairly time consuming to broadcast, receive and acknowledge back, and thereafter send an acknowledge reply. However, since the discovery process happens infrequently, and only generally during the configuration of lamps during initial install a time-consumptive discovery process that could take multiple seconds is generally acceptable to the user. However, when subsequently controlling the discovered lamps, any time delay or lag, and especially any popcorn effect is to be avoided. Even a fraction of a second, in some instances, is noticeably annoying to a user when performing control using the subsequently described groupcast and aggregated acknowledge mechanism.

Returning to FIG. 8, the discovery procedure, albeit relatively slow compared to the control procedure begins with a broadcast discovery message 36 through which that message is routed through possibly multiple hops 38 to all of the various nodes, including physical lamps and physical keypads 40. Each of those nodes, keypads and lamps unicast and acknowledge back to the controller 42, which must be routed as an acknowledge signal through the mesh network 44, whereupon the controller then receives the acknowledge hopefully having all of the unique MAC addresses of the physical lamps by indicating a blue light output from all such lamps and a blinking physical keypad of the discovered keypads.

Figure 9:
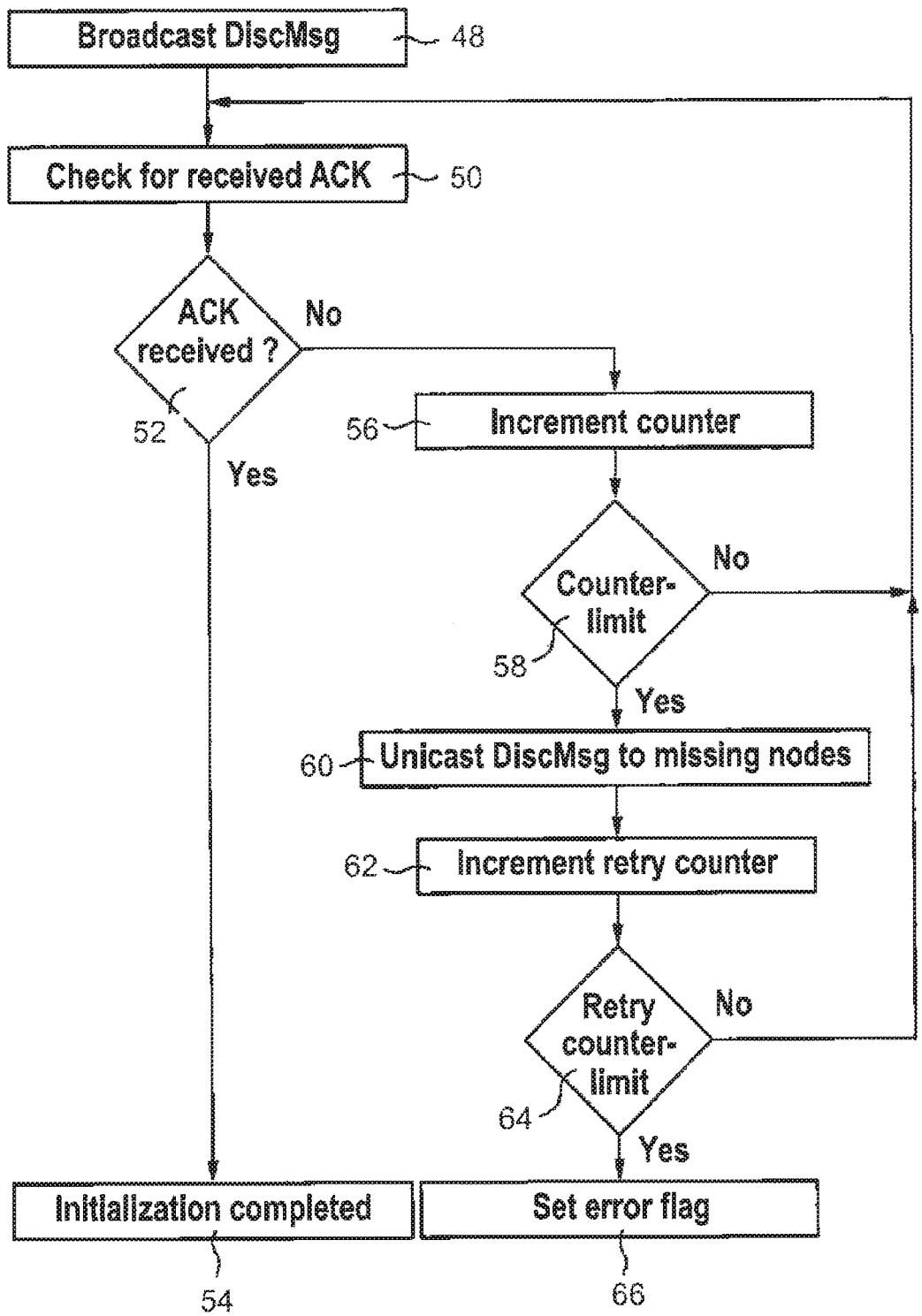
FIG. 9 is a flow diagram of the discovery procedure with acknowledge timeout.

FIG. 9 illustrates the discovery mechanism in more detail, and specifically illustrates a flow diagram of the timeout mechanism if an acknowledge back to the controller is not received in a specific amount of time. Similar to FIG. 8, a broadcast discovery message is sent from a controller 22, and thereafter the controller 22 determines whether an acknowledge message is received from all of the physical devices (physical lamps and physical keypads) at step 50. If acknowledge is received at decision block 52, then the initialization, or discovery procedure is completed 54. If acknowledge is not received from all of the physical devices, then a counter is incremented 56. If the counter has not limited out, then there is no need to send a unicast discovery message through the missing physical devices, or nodes. However, if the counter has limited out, then a unicast message is sent as shown by block 60, and another counter, a retry counter is initiated at block 62. The retry counter is incremented if it has not reached its limit 64, and the procedure continues with checking for any received acknowledge signals at step 50. If the retry counter has reached its limit, an error flag is set at step 66. Although it is not critical, it is preferred however than an acknowledge received counter and a retry counter is used as part of the discovery process, before the grouping process or procedure can thereafter take place.

Figure 10:
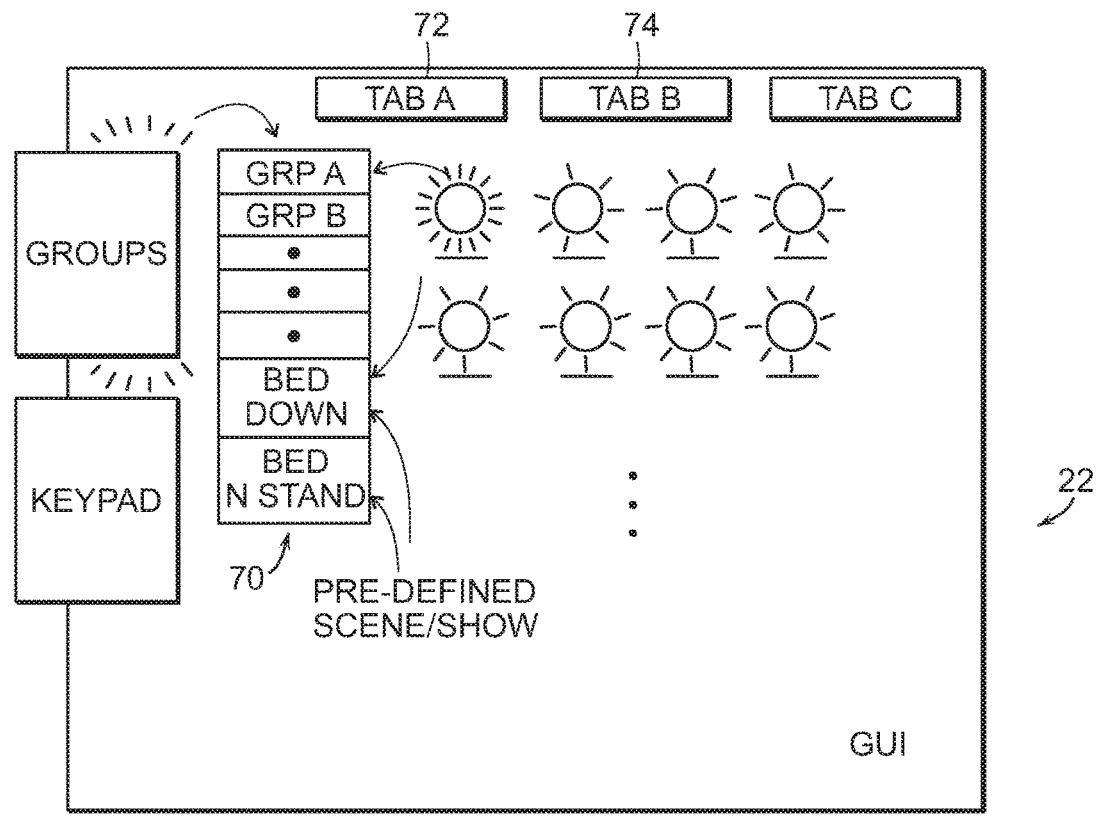
FIG. 10 is a GUI showing the discovery of lamps within a residence, followed by the selection and grouping of discovered lamps either to named groups having pre-defined scenes, or not.
Figure 11:
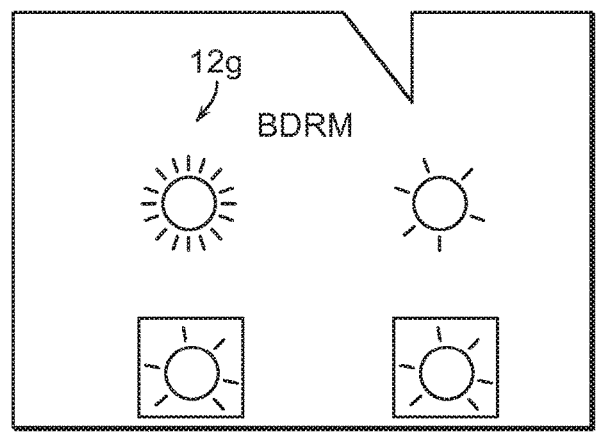
FIG. 11 is a plan view of the actual physical lamp being discovered and grouped in response to activities on the lamp icons of the GUI.

FIG. 10 illustrates the grouping procedure, where a GUI on the controller is used to group not only lamp icons, but also the physical lamps based on any group named by a user, or pre-existing groups with pre-existing scenes assigned thereto. FIG. 10 illustrates a GUI displayed on a controller 22. Upon the GUI, on a left hand portion of the GUI is an icon that represents either groups or keypads. When the groups icon is selected, as indicated, a series of groups can appear. According to one embodiment a series of group icons 70 appear. According to one embodiment, the group icons are not named until a user provides a name. Thus, for example, group A may be a name given to a group icon, or simply could be a default name given to a group icon. According to another embodiment, the groups shown as icons on the GUI of the controller 22 can have pre-defined names, such as the bedroom downlight or the bedroom night stand. In the latter embodiment, those pre-defined names may also have pre-defined scenes or shows. For example, the bedroom downlight may have a pre-defined scene or show that is uniquely assigned to the downlights, or lamps in the bedroom as content stored in that group of lamps. The uniquely assigned scene/show is preferably different from the pre-defined scene or show associated with the bedroom night stand group of lamps, for example. As shown in both FIGS. 10 and 11, after all of the lamps have been discovered and appear as virtual lamps or lamp icons in the right portion of the GUI of FIG. 10, one or more lamps can be grouped by clicking on the virtual lamp in the GUI and that virtual lamp, or lamp icon, may blink or change to a different color. The corresponding physical lamp within, for example, a bedroom will also change color, or blink, as shown by physical lamp 12*g* blinking that corresponds to a virtual lamp icon 70*a* blinking. In this fashion, the user will then know the correspondence between virtual lamp icons and physical lamps so that when he or she performs the grouping procedure it is known which lamp (virtual icon and physical) is assigned to each group as shown in FIGS. 10 and 11, where the bedroom down lamp 12*g* is assigned to group A according to one embodiment. According to another embodiment, the physical lamp 12*g* and its corresponding virtual lamp 70*a* can be assigned to a pre-defined group called bedroom downlight, that pre-defined group within the named group icons preferably has a pre-defined scene or show so that whatever virtual lamps are placed in the corresponding named group icon, the corresponding physical lamp will have stored contents that match the pre-defined scene or show and, when activated will display the contents stored therein.

As an example, if there are three rooms with one keypad in each room (i.e., kitchen, living and bedroom), in the bedroom there may be two A20 lamps on night stands and two PAR38 lamps in the ceiling. The user may want to control these two groups of physical lamps independently so that two groups are created called bedroom downlights and bedroom night stands, and these groups are shown as item number 70 in the GUI of controller 22. In the living room, there may be three A20 lamps and four PAR38 lamps. The user may want to create three named group icons 70 comprising one A20 on an end table next to a chair, two A20s on either end of the couch, and four PAR38s in ceiling, so three groups are created called living-downlight, living-end table-chair, and living-end table couch. The named group icons can be named by the user, or can be pre-defined with pre-defined scenes and shows associated therewith. In the kitchen, there may be four PAR38s in the ceiling that are controlled together, so a group called kitchen-downlight is created, or may pre-exist with an associated scene/show.

Using the example above, there are six groups of virtual lamp icons on the left side, with ten PAR38 lamp icons (virtual lamps) and five A20 lamp icons (virtual lamps) on the right side of the GUI. All the lights are still blue. When a lamp icon is clicked on by the user, the corresponding physical lamp and its associated MAC address changes color momentarily, as shown when, for example, the virtual lamp icon 70*a* is clicked on. The user will enter, for example, the bedroom and will note the corresponding physical lamp 12*g* changes color or flashes indicating its correspondence to virtual lamp 70*a*. The user then, for example, drags and drops the two virtual lamp icons into the group on the left called bedroom-night stands, for example. This process can continue for the other groups where, for example, the user can click on the PAR38 virtual lamp icons until the two in the bedroom are identified and then drags and drops those virtual lamp icons into the group called bedroom-downlights. When a virtual lamp icon is dropped into a group, the associated physical lamp turns back to its default light color, for example. The user can perform the same grouping procedure in the living room, kitchen, or throughout the residence 10.

Figures 12A, 12B, 12C:
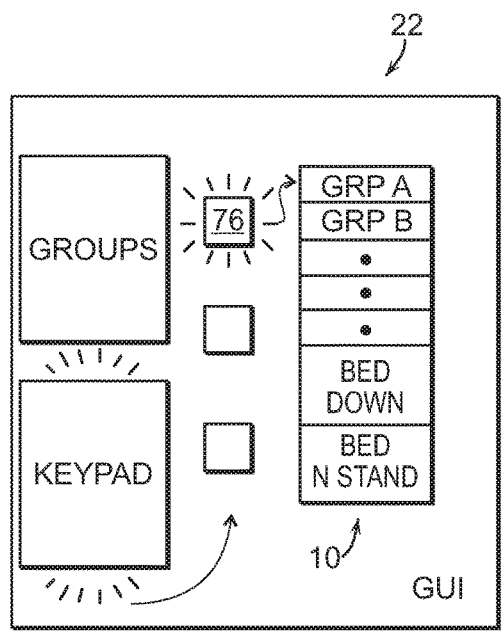
FIG. 12a is a GUI showing control devices, or physical keypads, being assigned to groups by selecting a keypad icon on the screen and associating same with at least one group, wherein the group shown on the GUI can be given any name via an entry onto the GUI, or can have a pre-defined name such as bedroom downlight or bedroom night stand.
FIG. 12b is a GUI showing assignment or a scene or show to a button on a control device, or physical keypad, and wherein a pre-defined scene or show can also be assigned to a button on a virtual keypad shown on a GUI of a mobile phone via an application.
FIG. 12c is GUI showing creation of any scene from among a substantially unlimited number of possible content variations and downloading the selected content to one or more groups of lamps.

At this point, all light icons on the right side of the GUI are gone since they have been, for example, dragged and dropped into a corresponding group named group icon 70. Moreover, all of the physical lamps are producing white light. The next step is to configure the physical keypads in each room. Configuration of the virtual keypads using, for example, a mobile phone control device will be described later. However, at the present, configuration of physical keypads is described. When configuring the keypads, the user can click on a different tab, for example, tab B, rather than tab A shown at the top of the GUI, shown as item numbers 72 and 74 of FIG. 10. By clicking on tab B, for example, given any name, such as, for example, device control rather than organization, the buttons on each keypad can be configured to produce a particular brightness, color, spectrum setting and visual attribute setting for a particular group of lamps. The device control procedure of configuring specific buttons on a physical keypad is shown in more detail in reference to FIGS. 12a and 12b. For example, configuring a particular keypad begins by selecting the keypad, as shown in FIG. 12a as the selection of the virtual keypad icon 76 after clicking on the keypad icon in the left portion of the GUI of controller 22. Once the virtual keypad icon 76 is identified, keypad icon 76 can be assigned to a group icon 70 to be named or a pre-defined named group icon. Thereafter, as shown in FIG. 12b, the GUI changes its display and presents a virtual keypad, with corresponding virtual buttons 78. Five virtual buttons are shown, however, there couple be more or less buttons as needed. A scene or show can be associated with a virtual scene/show icon 80 can then be selected and dragged and dropped onto the corresponding button. In this fashion, each button on the virtual keypad 76 can have an associated one or more groups of lamps within a residence, and a corresponding scene or show assigned to each of those group of lamps by downloading corresponding content to the physical lamps. Assignment of a group or a scene/show can also be performed from a dropdown menu, instead of drag and drop technique.

As an example, if there are two buttons that control the bedroom-downlight group and the bedroom-night stand group, the top two buttons could control each of those groups. The user assigns a particular color, brightness or any visual attribute to each of the various buttons and, in this case, the virtual buttons of the virtual keypad 76. The bottom button, for example, can be assigned to all of the groups controlled by the corresponding physical keypad, and the bottom button can be assigned to turn all the lights associated with the various groups attributable to that keypad. The process describing grouping of buttons to a bedroom can be repeated for the living room, the kitchen, and all of the remaining keypads within the residence, where physical or virtual keypads are selected and buttons of those physical or virtual keypads can be assigned to pre-defined or non pre-defined groups as well as scenes and shows.

After programming into the various virtual buttons of the virtual keypad displayed on the controller 22 GUI, the corresponding group addresses and corresponding content of the assigned scenes and shows are downloaded from the virtual keypad 76 to the physical keypad, such as physical keypad 14b of FIG. 1. The physical keypad will operate identical to the virtual keypad, in that touching any button corresponding to the five buttons on the virtual keypad will send a groupcast control message to the physical lamps being controlled by the physical keypad. Moreover, similar to the identification of physical lamps when performing grouping of virtual lamp icons, the physical keypad associated with the virtual keypad 76 will blink when that virtual keypad is selected. For example, when virtual keypad 76 is selected within the GUI of controller 22, the corresponding physical keypad (e.g., physical keypad 14b) will blink indicating to the user which keypad within the home has been selected.

As shown in FIG. 12b, along with the five virtual buttons 78 of the virtual keypad 76, are up/down buttons 82. The up/down buttons are not programmed in the virtual keypad 76 but have a specific function in the physical keypad. For example, once a corresponding button on the physical keypad is actuated after having been programmed using the virtual button on the GUI, the corresponding group of physical lamps turn on. The physical keypad may have buttons or touch lights corresponding to the virtual slider lights 82, which are non-operable on the virtual keypad but operable on the physical keypad to adjust brightness of the lights controlled by the last button pushed on the physical keypad. For instance, if the top button of the physical keypad in the bedroom sets the bedroom-downlight to red at half brightness, the up/down arrows would adjust the brightness of the bedroom-downlight after the top button of the physical keypad is pushed. The up/down arrows would control the brightness of the bedroom-night stands after, for example, a third or fourth button on the bedroom physical keypad was pushed. During normal operation, when an up/down arrow is pushed, a message is sent using groupcast addressing to the group of physical lamps associated with the keypad button.

According to one embodiment, the group assigned to a virtual button on a virtual keypad, and thus to the physical button on the physical keypad can also be assigned to a pre-defined scene or show through use of a drop down icon 84. The drop-down notes the pre-defined scene or show applied to a group, and through the GUI of controller 22, the group and its corresponding scene or show is applied to, for example, a virtual button on the virtual keypad 76 which then downloads that group, scene or show to a physical button on the corresponding physical keypad that was blinking to indicate it was selected for programming. After all of the buttons have been programmed to their corresponding pre-defined group name with pre-defined scene and show, or according to another embodiment, to any user-defined, and non pre-defined group name or scene and show, the physical keypad discontinues its blinking to indicate it has been fully programmed.

Figures 13A, 13B, 14, 15:
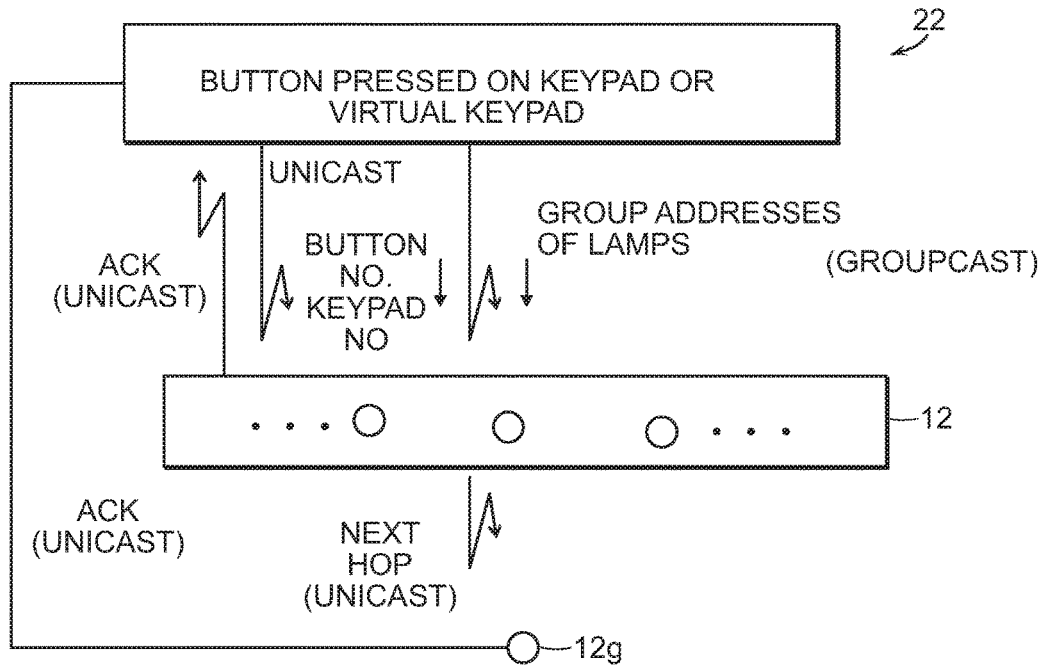
FIG. 13a is a table showing an example of a button sending a control message to retrieve a specific group address of grouped unique addresses of lamps from the physical or virtual keypad.
FIG. 13b is a table showing an example of a button sending a control message to retrieve and activate content stored in a corresponding group of lamps based on the desired scene or show.
FIG. 14 is a table showing a unique lamp address corresponding to possibly more than one grouping of lamps and therefore having more than one group address, yet a single scene of contents stored therein.
FIG. 15 is a table showing a groupcast control messages sent from a physical or virtual keypad control device and if one or more of the group of lamps that receive the groupcast control message do not respond with an acknowledge message, unicast sending of an acknowledge message back to the control device via the missing lamp.

According to one embodiment, if the scene and show was not pre-defined and assigned to a pre-defined group name, but instead is defined by a user to allow a button to take on any possible, substantially unlimited number of scenes or shows, a user can select the create scene or show button 86 as shown in FIG. 12. A corresponding GUI will then appear on the controller 22 as shown in FIG. 12c. The GUI allows the user to manually control any color, brightness or visual attribute to be assigned, by clicking on the manual control 88. The manual control can then bring up a blackbody curve to allow a user to pick any color along that blackbody curve 90, or to select any other visual attribute, such as CCT, tint, vibrancy, red green blue (RGB), brightness, etc. using sliders 92 for each. Moreover, the user can assign times, either in increments or time of day 94, for each attribute, color or brightness to produce what is herein described as a show. The time can be programmed to for example daytime or nighttime to change brightness from the brighter daytime demand to a less bright nighttime demand, or to synchronize with the circadian rhythm of a user. If manual control is not desired, then the various color brightness and visual attributes can be drawn from a content library by clicking on icon 96, and assigning to each button the corresponding content from library 96. FIG. 12 illustrates what is known as a scene or show builder that, once created by clicking on button 86 and the GUI in FIG. 12c appearing, the created scene or show can then be assigned by thereafter clicking on button 80, for example, an assigning that created scene or show to a corresponding button on the virtual keypad, and thereafter downloading as content to the corresponding group of physical lamps whenever the corresponding button of the corresponding physical keypad is actuated. Thereafter, during a groupcast control message being sent when a button of a particular keypad is actuated, the keypad address and the button address is all that need be sent from the physical keypad to the corresponding group addresses of the physical group of lamps having corresponding content assigned to them by virtue of the assignment of the scene or show to the virtual keypad buttons and therefore to the physical keypad buttons. FIGS. 13a and 13b show this correspondence, along with FIG. 4. In particular, a keypad, such as physical keypad 1 within, for example, the bedroom can have five physical buttons. Each button can be assigned to a group of lamps as well as a scene (or show). By actuating button 4, for example, the group of physical lamps associated with group F are addressed when button number 1 of keypad 1 is sent within the payload of the control message. Button 1 of keypad 1 may then correspond to a unique group address within each of the physical lamps that have an index to the unique MAC addresses for those lamps. For example, when actuating button 4 of the physical keypad 1, keypad 1 and button 4 are groupcast to address the MAC addresses of lamp addresses 31, 28 and 17 to turn on those lamps in accordance with scene B stored as content within those lamps, and shown in FIG. 13b. Thus, the improved control message is one having a simple, shorted payload needed to send only the physical keypad address and its corresponding button address, which will then be decoded by the physical lamps that receive the groupcast message, and specifically only by lamps having the corresponding unique group address, and specifically the unique MAC addresses of each of those lamps associated with that unique group address. By only sending a keypad address and a button address, the groupcast message is one having a fairly small payload, and thus can achieve a faster decode on each of the unique addresses associated with the unique group address stored in a database within each of the physical lamps. This guaranteed groupcast method is further described in reference to FIG. 15. However, suffice it to say that within each physical lamp, and specifically the memory of each physical lamp, a lamp has a unique MAC address such as hexadecimal address 31 shown in FIG. 14. Moreover, each physical lamp also stores one or more unique group addresses as well as content. The unique group addresses for lamp hexadecimal 31 can be group F and H, and also contain content B. The data file of the lamp memory associates the unique address 31 with the group address, such as group address F, and actuates content B when a particular button preprogrammed to group F and scene B is actuated.

Figure 16:
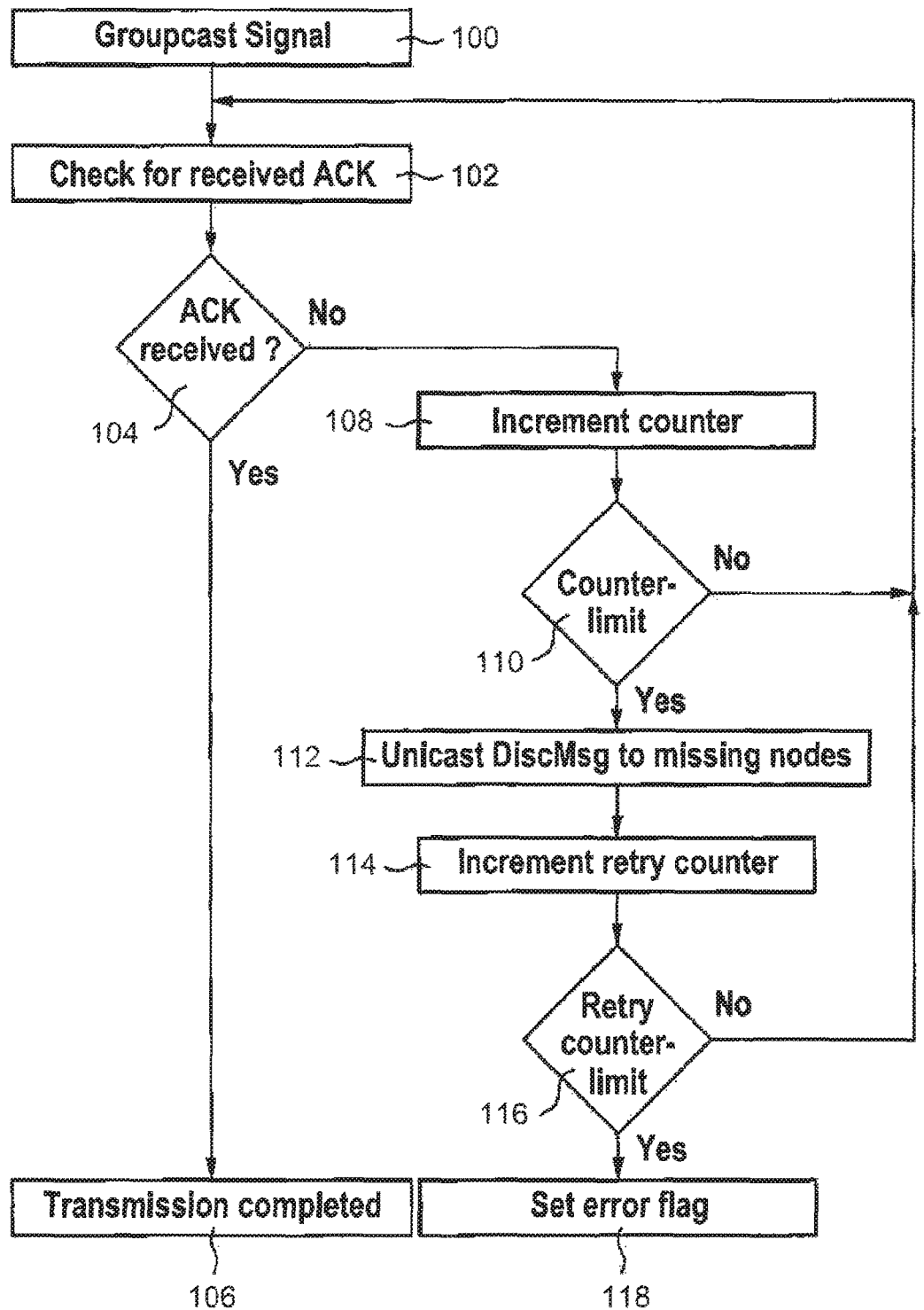
FIG. 16 is a flow diagram of the groupcast message procedure followed by the unicast acknowledge procedure of FIG. 15, with timeout.

As shown in FIG. 15, when the button is actuated or pressed on the physical keypad, or as described later, the virtual keypad of controller 22, the button number and keypad number is sent within the payload of the groupcast control message. Alternatively, the group addresses can be sent. The button number, keypad number, or the group addresses are received on the physical lamps 12 and an acknowledge signal is unicast back to the controller 22. If not all physical lamps 12 send back and acknowledge signal as detected by the controller 22, a unicast signal is sent from controller 22 to the particular unique address of the missing physical lamp, from hop-to-hop until it arrives on the missing physical lamp, 12Y, for example, which then sends back an acknowledge signal unicast to the controller 22 further details of the novel guaranteed groupcast, with aggregated single message acknowledge is described further in reference to FIGS. 17 and 18. Similar to the timeout mechanism of the broadcast discovery signal, FIG. 16 illustrates a flow diagram of the groupcast control signal 100, where an acknowledge is checked by the controller 102 and if an acknowledge is received 104, transmission is completed 106. If an acknowledge is not received by the controller at decision block 104, then a counter is incremented 108 and if the countdown has occurred before an acknowledge is received, then a unicast message 112, as shown in FIG. 15 is sent from the controller 22 to increment a retry counter on the unicast response 114. If the retry counter reaches its limit 116, then an error flag is set 118. If the retry counter does not reach its limits before an acknowledge is sent back from, for example, missing node 12y as shown in FIG. 15, then all acknowledge messages from all physical lamps within the group have been received.

Turning to an embodiment in which a mobile application is used, such as one stored within a smartphone operating under the Apple or Android operating system, the various named group icons can be pre-named or pre-defined, shown in FIG. 12a. Moreover, as shown by reference numeral 70 in FIG. 12a. Moreover, the scene and show attributable to the pre-defined named groups can also be pre-defined as shown by icon 84 in FIG. 12b. Instead of a user associating basic information such as the scene and show from a variety either manually or from a content library, as shown in FIG. 12c, the mobile application can automatically load pre-defined content into the physical lamps when each lamp is assigned to a particular group, or subgroup. When using a mobile app, the discovery step operates the same way as before, with the bridge or hub broadcasting the discovery command or message, in every physical device (physical lamp and physical keypad) within communication range response with its unique address. The hub then acknowledges receipt of each response and sends an internet protocol (IP) message to the mobile device with the list of physical devices in the system.

While the discovery step is the same, the grouping and scene assignment step or procedure is different. Instead of creating arbitrary names for groups of lights using the GUI of a controller, as in FIG. 12a, those names can be pre-defined, as shown in the lower two groups 70 of FIG. 12a, for example, importantly associated with each group in the list are different sets of scenes or shows, which translates to different sets of pre-determined content to be stored in the physical lamps. The pre-defined list of groups typically would include different types of rooms, such as kitchen, bedroom, living, dining, entry, closet, hall, bath, etc. The groups can also be defined with more granularity, such as kitchen-island, kitchen-range, kitchen-downlight, living-wall, living-table, master-night, master-table, and master-down, etc.

Once the list is complete, the user associates each lamp icon displayed on the mobile app from the discovery step with a physical lamp and drags and drops that icon into the desired pre-defined group having a pre-defined scene or show. When this association is made, a message is sent to the group of physical lamps that contain the content for those lamps. The content includes color, spectrum, brightness, etc., either static or as a function of time, including location, weather, etc., called scenes, or, if a function of time, shows. The pre-determined scenes or shows are sent to the lamp and stored in the lamp non-volatile memory. The content or scenes loaded into each physical lamp during this association or grouping procedure depends on the groups associated with each lamp. The group address for each group, if they exist, is also loaded into the physical lamp and non-volatile memory at this time.

When using a mobile app with pre-defined scenes or shows and those pre-defined scenes and shows assigned to pre-defined and pre-named groups, the need for creating names and assigning scenes or shows to each of the named groups is unnecessary. Moreover, downloading groups, scenes and shows to particular buttons on a physical keypad is also unnecessary. Each of the buttons on the mobile device is also unnecessary. The mobile device can contain as its GUI the keypads and specifically the buttons of the keypads, therefore eliminating the need for a physical keypad. The virtual keypad icons on the GUI of the mobile device operate just like the physical keypad that are hereinafter referred to as a virtual keypad, with virtual keypad buttons. The virtual keypad buttons are assigned to one or more groups, each virtual keypad button also assigned to a scene or show. Therefore, instead of assigning, for example, color, spectrum, brightness, CCT contents to the lamps in the specified group, a scene number 4 of the group is assigned to each button. The scene numbers in the associated keypad button number are sent through the groupcast message to the members of all the groups associated with each keypad button. During normal operation, when a virtual keypad button is pushed, groupcast messages are sent to the group of physical keypads associated with each keypad button indicating which button was pushed. Each lamp then performs the associated scene previously stored in the lamps non-volatile memory. The different buttons on the keypad can be programmed to control different groups of lights within a room, or to trigger different scenes stored in the non-volatile memory.

With the mobile application, there is no need for physical keypads, and the lighting control system can be controlled by virtual keypads that reside within the mobile app. Such virtual keypads are configured and do operate the same as the physical keypads. The mobile application has a main control page that provides buttons for all virtual keypads, for instance, one in each room.

Broadcast messaging is essential for the initial device discovery procedure. Such broadcast messaging elicits a response from all physical devices that receive such messages. The response messages are unicast back to the source address, and in this case the controller, that sent the broadcast message. Such unicast messages may go directly back to the controller, or they may take one or more hops through the mesh network. Each physical device that sends such a unicast message must also receive an acknowledge back to that device to prevent that device from resending the same message. In a typical mesh network, the acknowledge is sent by the receiving controller or, in the case of a mobile phone, by the hub.

The broadcast discovery message may pass through many hops to an end physical device, or physical lamp, and the response may pass through the same number of hops to the controller, and thereafter another acknowledge may again pass through the same number of hops to the end physical lamp. Since every physical lamp must respond and be acknowledged, the discovery process can create a significant amount of message traffic. However, since the discovery is not necessarily time critical and is seldom performed, this is not a significant issue.

Beneficially, the content associated with scenes is stored in the physical lamp non-volatile memory instead of in the physical or virtual keypads to reduce network message traffic. When a button is pushed, only the button number is groupcast to the group addresses associated with that button. Such groupcast messages contain the source address in the header, so the physical lamps know which keypad (physical or virtual) is sending the message in case multiple keypads control the same group. All physical lamps in a group must acknowledge receipt of the groupcast message. If not, the system will not know if one physical lamp for instance did not receive the message to turn off and, as such, stays on. In the case of a system with physical keypads, the individual addresses of each member of the group associated with buttons on that keypad can be stored in the keypad non-volatile memory.

When a button that controls one group for instance is pushed, or actuated, one groupcast message is sent indicating which button was pushed. All members of that group must respond with an acknowledge message to the keypad. Such acknowledge message may pass directly from a physical lamp to the keypad or may go through many hops. If the keypad does not get an acknowledge from a device within the group the keypad sends a unicast message to unresponsive devices directly until the keypad receives an acknowledge back. This is described in reference to FIGS. 15 and 16. The keypad thus guarantees that all members of the physical lamp group received the groupcast message.

A groupcast message from a keypad (whether physical or virtual) can generate a significant amount of acknowledge message traffic. Although the acknowledge message is needed to guarantee the groupcast was received, the acknowledge does require traffic bandwidth. In a large mesh network, for example, in which acknowledge messages must take many hops, the traffic can slow network response time significantly. At some point, the delays will become obvious to a user. For instance, if one physical lamp does not receive the groupcast message to turn off, the time the keypad needs to determine this and send a unicast message may be on the order of seconds, which may be unacceptable to a user.

Figure 17:
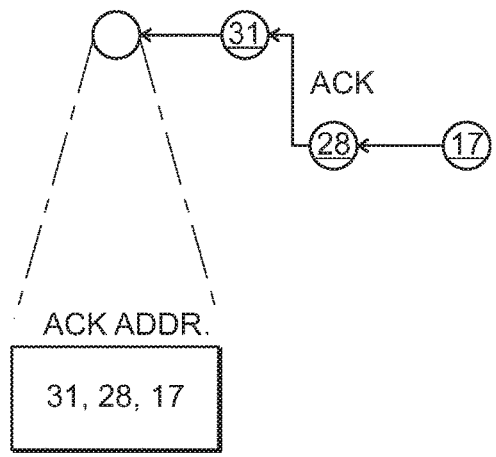
FIG. 17 shows the unicast acknowledge message sent across a single lamp-to-lamp path across the network of lamps to the control device.

To minimize such acknowledge delays, it is important that one minimize the number of messages to take to multiple hops. To do so, the acknowledge message is aggregated using the novel single message app aggregated methodology described in FIGS. 17 and 18. Since lamps are typically stationary, the path that acknowledge messages take through the mesh network typically does not change significantly. As such, each physical lamp node operates as a router, with routing tables stored in the lamp non-volatile memory. The routing tables keep track of the acknowledge message traffic passing through the mesh network, from physical lamp to physical lamp. For instance, if three lamps at the far end of the hallway always hop their acknowledges through a particular fourth lamp, the fourth lamp stores the addresses of the first three lamps. This is shown in FIG. 17, where the fourth lamp stores the addresses of the acknowledge back messages of the more distal lamps, with addresses 31, 38 and 17 as shown. When a subsequent groupcast message is sent, the fourth lamp 124 will wait to receive acknowledge messages from the other lamps with addresses 31, 28 and 17. Once all three acknowledge messages are received at the fourth lamp labeled 124, the fourth lamp will send one message, and only one message, to the keypad (virtual or physical) that includes acknowledgment from all four lamps, including lamp 124 in that single message. Using a single message aggregated address acknowledge back mechanism substantially reduces network message traffic and associated latencies.

Figure 18:
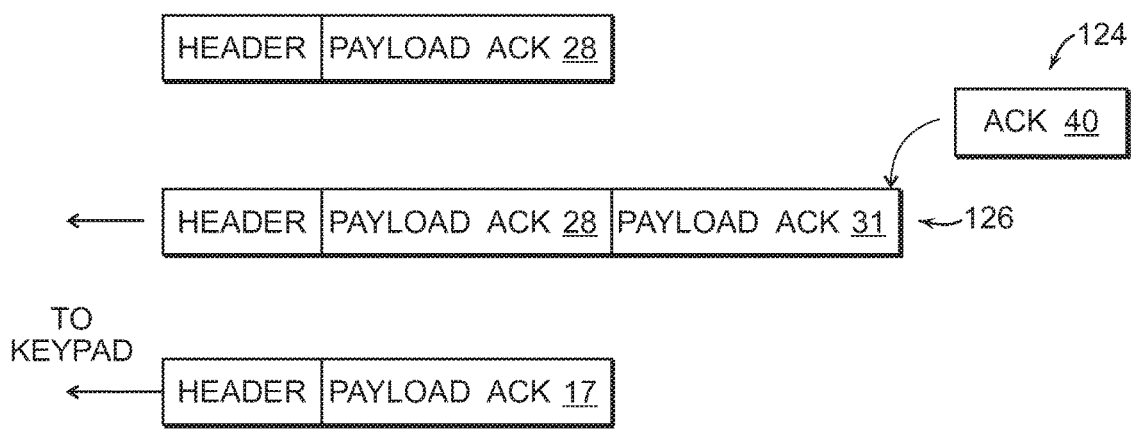
FIG. 18 shows aggregation of unique addresses of each of the group of lamps as the acknowledge message is sent across the single lamp-to-lamp path, with a separate path taken by a lamp unique address missing from the aggregated acknowledge message.

If the fourth lamp receives acknowledge messages from only two of the three first lamps, such as that shown by reference 126 of FIG. 18, and those addresses for those two lamps 28 and 31 are only sent after a certain timeout period, the fourth physical lamp 124 sends an acknowledgement from only itself and the two lamps back to the keypad. Thus, appended, or aggregated to the single message 126 will also be the payload acknowledge address for lamp 124 having, for example, an address of hexadecimal 40. Thus, the aggregated payloads of only three physical lamp addresses are sent back to the keypad. In this case, however, the third lamp, with a hexadecimal address 17, for example, will dynamically adjust based on the pre-stored routing tables to have sent its acknowledge through another lamp-to-lamp route to the keypad. For example, the payload acknowledge hexadecimal address 17 can be sent directly to the keypad, or appended (or aggregated) with other missing physical lamp addresses. The routing of acknowledge is dynamic and can readily change based on the pre-stored routing tables. Importantly, acknowledgement is guaranteed so as to ensure that the groupcast message is also guaranteed. Thus, delivery of the groupcast message through acknowledgement and minimization of the acknowledge message traffic using minimal acknowledge message pathways (preferably only one) is achieved by maintaining routing tables and combining or aggregating knowledge messages.

The routing tables can be established for each hop is defined by the source and destination addresses, as shown in FIG. 7. The routing tables can be also established during the discovery procedure. The network layer of the OSI model manages mesh or routing within, for example, a ZigBee network using such routing tables in each full function device and network headers within the MAC message payload. The network header comprises the addresses of the original message source and the final message destination in a unicast message. Such messages may make many hops through the mesh network. The route through the mesh network that a unicast message takes is determined by routing tables within routing capable devices, such as the physical lamps herein. When a routing device (physical lamp) receives a message with a destination address in the network header that matches an address in its routing table, the routing lamp device retransmits the message with the destination MAC address sent to the address of the next device in the path to the eventual destination. By knowing for each physical lamp the parent and children addresses, messages are sent with the packetized address being the unique address of the next hop node, or physical lamp. Routing tables should be set up to minimize the number of hops between the controller and every physical lamp. Each hop however, must have some level of link quality to ensure reliable communications. A possible procedure for setting up a network could be one in which the controller sends out an initiation message three times with its unique source address. Every physical lamp that receives such a message sends a unicast message back to the controller indicating how many initial messages it received in an indication of the received signal screen. The controller then instructs each identified child physical lamp to send an initial message three times with its unique source address. Child lamps, or devices, of the controller do not respond. When a successive child of the controller sends its initial message, children of another child do not respond either. This process continues until no devices respond to the initial messages.

When the network powers up each time, or when just some number of physical lamps are powered off and then on again, routing tables can be re-initialized which dictate the path that unicast messages take through the mesh network. In the discovery procedure, a physical lamp broadcasts a route discovery command with an ID in the destination address. Any routing capable device, such as the physical lamp, that receives such messages creates an entry comprising the ID, the address of the broadcasting device, and the destination address and re-broadcasts the message. The radius in hops is decremented each re-broadcast. Once the re-broadcast message reaches the destination, the destination response with a message to the device that was the last to re-broadcast the message. That device then creates a routing table entry after received such message indicating destination address and next topic address. Once all unicast routing tables are setup, groupcast acknowledge tables are determined. Similar to the unicast routing tables, the groupcast acknowledge tables shown in FIG. 17, for example, are provisioned so that the controller knows from provisioning the addresses of all of the physical lamps in each group. Groupcast messages or messages to change a scene must be acknowledge by every physical lamp in each group thereby addressed. The scene is changed when each device receives the groupcast message, and the keypad or controller receives the acknowledge a short time later. If all acknowledges do not come back, the controller can send unicast messages to those devices that did not acknowledge. The acknowledge messages are combined or aggregated by the routing devices as they progress back to the controller to reduce network traffic.

Once all of the physical lamps have been grouped, the controller unicasts using the routing table. The unicast message is sent to the group to each of the physical lamps so that those lamps contain not only their unique MAC addresses but also the group address. Each keypad (physical or virtual) must know the unicast address of every lamp in each group in order to guarantee groupcast. Thus, each button of the keypad knows the corresponding unique groupcast address but also within a data file the corresponding unique MAC address of every physical lamp within that group.

During the initial discovery procedure broadcast occurs from the controller with some maximum radius. Each physical lamp sends a unicast message back down the mesh network to the controller. The controller has the address of all nodes, but routing tables are not yet set up. The controller issues route discovery commands to every physical lamp, which sets up routes for the controller through all routers within each physical lamp to each subsequent lamp. Lamps are assigned to groups, and the group addresses are unicast to each lamp. The group addresses and the unique addresses of each lamp are then used as part of the subsequent command message procedure.

Keypads would already have identified themselves and the controller would have discovered routes and set up routing tables to each keypad. During provisioning, the groups associated with each button, along with the unicast addresses of the physical lamps in each group are unicast to each keypad. The controller discovers the routes to each keypad and the keypads respond down the mesh tree to the controller. The scenes associated with each button can then be groupcast or unicast to all of the lamps.

Groupcast is basically the same as broadcast, but with a group address in the payload of the message. The group address, however, can be in the form of simply a bit in the header specifying group or unicast messaging, as well as a button number and keypad number within the payload. Groupcast messages are broadcast with some radius, with routing tables being interrogated to determine whether or not the groupcast message should be re-broadcast by any particular routing capable physical lamp.

By using routing tables, and also setting up an acknowledge routing table, the groupcast control message is guaranteed to be received on each of the group of lamps having a corresponding group address. This result is in part, due to each of the group of lamps sending back an acknowledge signal. Importantly, the groupcast signal is preferably sent to each of the group of lamps at substantially the same time and, through use of the acknowledge routing table, a single pathway is preferably achieved using an aggregated payload of unique addresses of the group of physical lamps that receive a groupcast signal. The combination of using a groupcast signal with group addresses and an aggregated, single pathway acknowledge signal achieves not only a guaranteed groupcast but also a groupcast with minimal delay related artifacts, such as not all lights changing at the same time.

It will be appreciated to those skilled in the art having the benefit of this disclosure that the invention is believed to provide an improved downloading mechanism of visual content into lamps after assigning such lamps to a group, and also to guarantee broadcast and groupcast messaging necessary to illuminate lamps in a mesh network without visible delay related artifacts. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than restrictive sense.

What is claimed is:

1. A lighting control system, comprising:
   a plurality of lamps interconnected within a residence by a wireless mesh network, wherein a group of lamps within the plurality of lamps each comprise a unique address and a group address that is dependent on where within a residence the group of lamps reside;
   a control device wirelessly coupled to the group of lamps and comprising a data file that associates the unique address with the group address;
   a button configured on the control device that, when actuated, is configured to send a groupcast control message to only the group of lamps having their unique address associated with a unique group address; and
   a receiver on the control device for receiving a unicast acknowledge message from each of the group of lamps that receive the groupcast control message, wherein the unicast acknowledge message is sent through a single, first lamp-to-lamp path across the wireless mesh network based on routing tables stored within each of the plurality of lamps.

2. The lighting control system as recited in claim 1, wherein the groupcast control message is received upon the plurality of lamps at substantially the same time.

3. The lighting control system as recited in claim 1, wherein the groupcast control message is received upon the plurality of lamps based on the distance from the control device and not on any hops through intermediate lamps within the network between the control device and the plurality of lamps.

4. The lighting control system as recited in claim 1, wherein the unicast acknowledge message is a single message aggregated with the unique address of each of the group of lamps.

5. The lighting control system as recited in claim 4, wherein if the single message aggregated with the unique address of each of the group of lamps does not contain the unique address of all the group of lamps then another unicast acknowledge message is received by the receiver through a single, second lamp-to-lamp path dissimilar from the first lamp-to-lamp path.

6. A method for controlling a plurality of lamps within a wireless network, comprising:
   assigning a unique address to each of the plurality of lamps;
   associating the unique address with a group address for a grouped subset of the plurality of lamps;
   sending a groupcast control message to only the grouped subset of the plurality of lamps having the group address; and
   returning a unicast acknowledge message as a single message having aggregated unique addresses of the grouped subset of the plurality of lamps that received the groupcast control message, wherein the unicast acknowledge message is returned from each of the grouped subset of the plurality of lamps through the wireless network from lamp-to-lamp based on routing tables stored within each of the plurality of lamps.

7. The method as recited in claim 6, further comprising receiving the groupcast control message upon the grouped subset of the plurality of lamps at substantially the same time based solely on distance from the control device and not on any hops through any of the plurality of lamps.

8. The method as recited in claim 6, further comprising returning another unicast acknowledge message from a lamp within the grouped subset of the plurality of lamps that did not receive the groupcast control message.

* * * * *